United States Patent
Park

(10) Patent No.: US 7,273,138 B2
(45) Date of Patent: Sep. 25, 2007

(54) DAMPING FORCE VARIABLE VALVE AND SHOCK ABSORBER USING SAME

(75) Inventor: Kyushik Park, Kyonggi-do (KR)

(73) Assignee: Mando Corporation, Kyonggi-Do (KR)

( * ) Notice: Subject to any disclaimer, the term of this patent is extended or adjusted under 35 U.S.C. 154(b) by 26 days.

(21) Appl. No.: 11/044,024

(22) Filed: Jan. 28, 2005

(65) Prior Publication Data

US 2005/0167216 A1 Aug. 4, 2005

(30) Foreign Application Priority Data

Feb. 3, 2004 (KR) ...................... 10-2004-0006931

(51) Int. Cl.
*F16F 9/64* (2006.01)
(52) U.S. Cl. ................ 188/322.2; 188/266.6; 188/313; 188/282.3; 188/282.5
(58) Field of Classification Search ............ 188/266.6, 188/322.2, 322.13, 310, 313, 314, 317, 278, 188/282.2, 282.3, 282.5, 282.8, 266 X, 313 X, 188/282.3 X, 282.5 X
See application file for complete search history.

(56) References Cited

U.S. PATENT DOCUMENTS

| | | | | |
|---|---|---|---|---|
| 5,960,915 | A * | 10/1999 | Nezu et al. | 188/266.6 |
| 6,079,526 | A * | 6/2000 | Nezu et al. | 188/266.6 |
| 6,155,391 | A * | 12/2000 | Kashiwagi et al. | 188/266.6 |
| 6,182,805 | B1 * | 2/2001 | Kashiwagi et al. | 188/266.6 |
| 6,474,629 | B2 * | 11/2002 | Beck et al. | 267/64.16 |
| 6,527,093 | B2 * | 3/2003 | Oliver et al. | 188/322.2 |

* cited by examiner

*Primary Examiner*—Devon Kramer
(74) *Attorney, Agent, or Firm*—Bacon & Thomas, PLLC

(57) ABSTRACT

A damping force variable valve includes a main valve provided between a high pressure section and a low pressure section, for allowing a flow of oil from the high pressure section into the low pressure section when the main valve is opened, the main valve being capable of being opened or closed depending on a pressure of the high pressure section, an initial preload and a pressure of a control chamber; a first variable orifice provided between the high pressure section and the control chamber, for controlling the pressure of the control chamber; a fixed orifice provided between the control chamber and the low pressure section; and a second variable orifice provided between the high pressure section and the low pressure section.

14 Claims, 5 Drawing Sheets

DAMPING FORCE VARIABLE VALVE AND SHOCK ABSORBER USING SAME

FIELD OF THE INVENTION

The present invention relates to a damping force variable valve for varying a damping force of a vehicle and a damping force variable type shock absorber including same; and, more particularly, to a damping force variable valve capable of simplifying its structure and increasing the degree of freedom in tuning by changing the position and the structure of a variable orifice for adjusting a pressure of a control chamber and a flow rate characteristic at a low speed; and a damping force variable type shock absorber using same.

BACKGROUND OF THE INVENTION

In general, a suspension system for use in a vehicle controls a damping force in relation to relative movements of a vehicle body and wheels. For example, the damping force variable type shock absorber including the damping force variable valve absorbs vibrations of the vehicle caused by irregularities of a road when the vehicle is in a normal drive mode, thereby improving ride comfort. Meanwhile, when the vehicle makes a turn, accelerates, brakes or runs at a high speed, the shock absorber increases the damping force and prevents a posture change of the vehicle body, to thereby improve stability in controlling the vehicle.

Since the movement of the wheels of the vehicle requires rapid response more than 10 Hz, there have been made various attempts to develop a valve capable of rapidly adjusting a damping force by means of a mechanical valve mechanism inside the shock absorber depending on the relative movements of the vehicle body and the wheels of the vehicle while independently controlling damping force characteristics during a compression and a rebound stroke.

Conventional variable valves for use in a suspension system are classified into two groups depending on the type of damping force control methods: normal type variable valve and reverse type variable valve. A reverse type variable valve controls the compression stroke and the rebound stroke by using separate valves incorporated therein depending on the movement of the vehicle. Thus, the reverse type variable valve serves to generate a small damping force during the rebound stroke while generating a great damping force during the compression stroke or vice versa. Since, however, the reverse type variable valve uses the separate valves, manufacturing costs are increased and the size of the reverse type variable valve is enlarged as well, resulting in a reduction of installation efficiency.

A normal type variable valve controls a damping force during both the compression stroke and the rebound stroke by using a single valve. Thus, the normal type variable valve serves to generate a great damping force or a small damping force in both of the rebound stroke and the compression stroke.

Referring to FIG. 1, there is provided a cross sectional view showing the configuration of a conventional variable type shock absorber 1. The interior of a cylinder 10 is divided into a rebound chamber 2 and a compression chamber 3 by a piston 11 which moves up and down inside the cylinder 10. Further, a piston rod 12 and a reservoir 13 are configured such that they are communicated with the cylinder 10, wherein one end of the piston rod 12 is connected to the piston 11 while the other end thereof is extended to the outside. The reservoir 13 serves to compensate a volume variation of the inside of the cylinder 10. Further, a valve 14 for allowing a flow of oil between the rebound chamber 2 and the compression chamber 3 is installed at the piston 11, and a valve 15 for allowing a flow of oil between the reservoir 13 and the compression chamber 3 is disposed at a bottom portion of the cylinder 10. Here, one or a plurality of check valve for allowing a flow of oil in a certain direction without generating a damping force and a damping valve for allowing a flow of oil in a certain direction while generating a damping force can be used as the valves 14 and 15. A damping force variable valve 20 is installed at one end of an outer diameter portion of a base shell 16 serving as a casing of the shock absorber 1.

FIG. 2 shows the configuration of a conventional normal type variable valve, which includes a fixed orifice 22, a control chamber 23, a variable orifice 24, a solenoid coil 26, a solenoid member 27, a spring 28, a valve member 29 and a valve seat 30, and so forth.

Assume that an acceleration is generated in a vertical direction of the suspensions system, such as left and right wheels of the vehicle or control arms (not shown), due to vibrations and driving state of the vehicle when the vehicle is running. In case of the conventional normal type variable valve configured as described, an acceleration detecting sensor (not shown) detects an acceleration and transmits a signal to an ECU (not shown) and the ECU investigates the received signal. Then, if electric current is allowed to flow to the solenoid coil 26, a magnetic field is generated, and a position of the solenoid member 27 provided at a central portion of the solenoid coil 26 is controlled by using the magnetic field.

A fluid is introduced into the control chamber 23 from a high pressure section 21 via the fixed orifice 22 and is introduced into a low pressure section 25 via the variable orifice 24. However, in case the pressure difference between the high pressure section 21 and the control chamber 23 is increased due to an increase of a flow rate of the fluid during a rebound or a compression stroke, the valve member 29 having been in a firm contact with the valve seat 30 by an elastic force of the spring 28 gets lifted from the valve seat 30. As a consequence, a main valve including the valve member 29 and the valve seat 30 is opened, so that the fluid becomes to flow from the high pressure section 21 to the low pressure section 25 directly without passing through the control chamber 23.

A point in time when the valve member 29 is lifted from the valve seat 30 is referred to as a blow-off time. The blow-off time is determined by a cross sectional area of the variable orifice 24. Specifically, when the electric current is flown to the solenoid coil 26, the position of the solenoid member 27 is determined by a magnetic force of the solenoid, whereby the cross sectional area of the variable orifice 24 is determined. Thus, by adjusting the cross sectional area of the variable orifice 24, the blow-off time when the main valve is opened can be controlled, so that the damping characteristics of the variable valve can be controlled.

Referring to FIG. 3, there is illustrated a flow passage diagram of the normal type damping force variable valve shown in FIG. 2. As shown therein, the conventional normal type damping force variable valve includes a first flow passage Qc having a fixed orifice Kc, a control chamber and a variable orifice Kv between a high pressure section Ph and a lower pressure section P1; and a second flow passage Qm having a main valve Km. Here, if the pressure difference between the high pressure section Ph and the control chamber is increased, the main valve Km is opened by overcoming the elastic force of the spring. That is, by controlling a pressure Pc of the control chamber by way of adjusting the cross sectional area of the variable orifice Kv provided downstream of the control chamber, a desired damping characteristic can be obtained.

Since an appropriate damping force should be generated within a range where a flow rate is great, i.e., where the piston moves at a high speed (hereinafter, referred to as a high speed range) in order to obtain an appropriate damping force characteristic, the blow-off time of the main valve needs to be obtained at a low flow rate and a high pressure in a hard mode (in which the cross sectional area of the variable orifice is reduced). For this, active area of the high pressure section of the main valve should be always greater than the active area of the control chamber in the structure of the conventional normal type damping force variable valve, which results in a complicated structure of the main valve. Moreover, since the pressure and the flow rate characteristics are controlled by the single variable orifice within a range where a flow rate is small, i.e., the piston moves at a low speed (hereinafter, referred to as a low-speed range), prior to the blow-off time, there is a drawback in that the tuning of damping force can not be performed independently within the low speed range in a soft mode and a hard mode.

SUMMARY OF THE INVENTION

It is, therefore, an object of the present invention to provide a damping force variable valve capable of simplifying the structure of a main valve by using an inventive structure and increasing the degree of freedom in tuning a damping force in a low speed range by controlling a damping force characteristic of each of a soft mode and a hard mode through the use of different orifice characteristics; and a shock absorber including same.

In accordance with a preferred embodiment of the present invention, there is provided a damping force variable valve for use in a damping force variable type shock absorber, including: a main valve provided between a high pressure section and a low pressure section, for allowing a flow of oil from the high pressure section into the low pressure section when the main valve is opened, the main valve being capable of being opened or closed depending on a pressure of the high pressure section, an initial preload and a pressure of a control chamber; a first variable orifice provided between the high pressure section and the control chamber, for controlling the pressure of the control chamber; a fixed orifice provided between the control chamber and the low pressure section; and a second variable orifice provided between the high pressure section and the low pressure section.

In accordance with another preferred embodiment of the present invention, there is provided a damping force variable type shock absorber comprising a cylinder having oil sealed therein; a piston moved up and down inside the cylinder while dividing the inside of the cylinder into a rebound chamber and a compression chamber; a piston rod whose one end is connected to the piston while the other end thereof is extended to the outside of the cylinder; a reservoir communicated with the cylinder while compensating a volume variation of the inside of the cylinder; and a damping force variable valve, wherein the damping force variable valve includes a main valve provided between a high pressure section and a low pressure section, for allowing a flow of oil from the high pressure section into the low pressure section when the main valve is opened, the main valve being capable of being opened or closed depending on a pressure of the high pressure section, an initial preload and a pressure of a control chamber; a first variable orifice provided between the high pressure section and the control chamber, for controlling the pressure of the control chamber; a fixed orifice provided between the control chamber and the low pressure section; and a second variable orifice provided between the high pressure section and the low pressure section.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Figure 1:
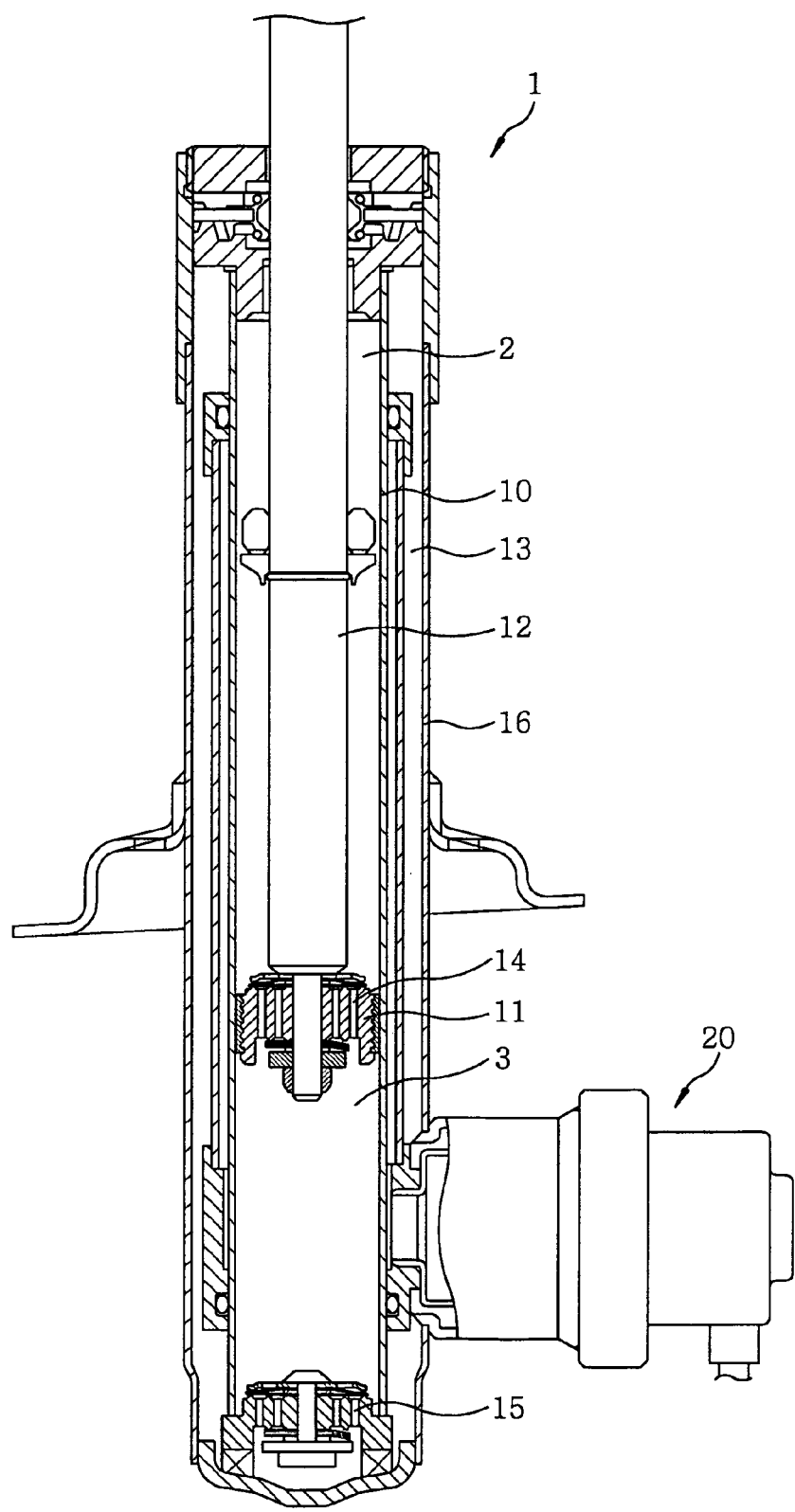
FIG. 1 is a cross sectional view of a shock absorber including a conventional normal type damping force variable valve.
Figure 2:
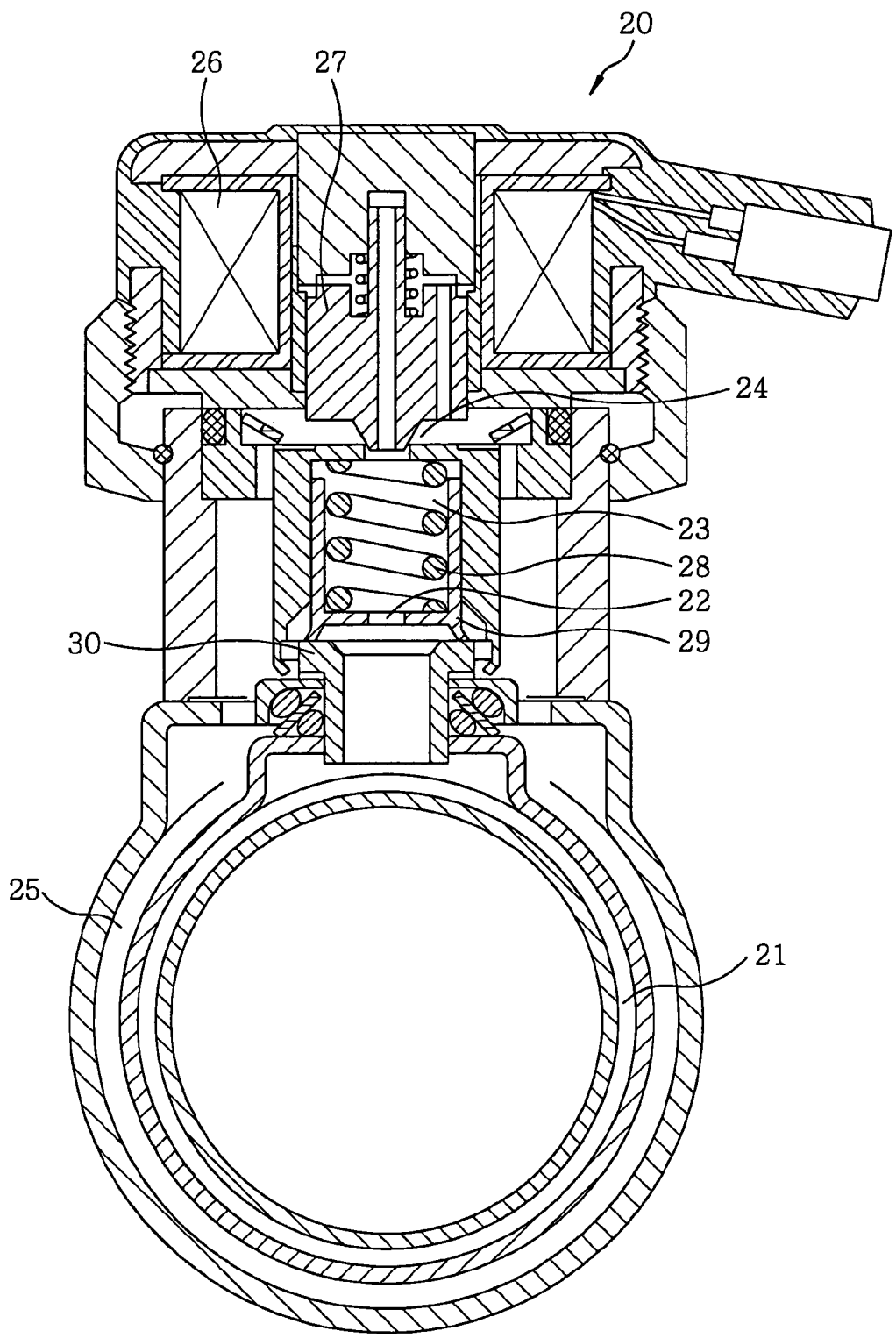
FIG. 2 sets forth a cross sectional view showing the configuration of the conventional normal type damping force variable valve.
Figure 3:
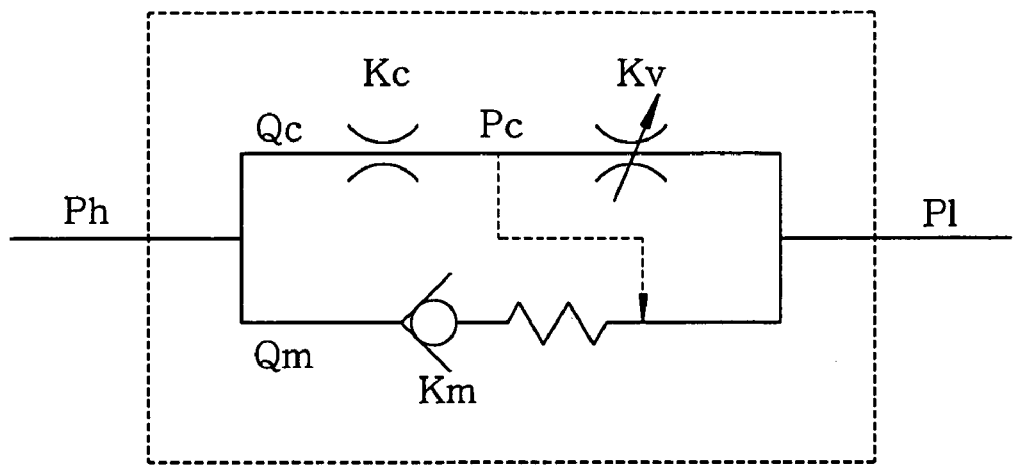
FIG. 3 is a flow passage diagram showing passages of the conventional normal type damping force variable valve.

Hereinafter, preferred embodiments of the present invention will be described in detail with reference to the accompanying drawings. Here, parts identical to those described in the prior art will be assigned like reference numerals, and detailed description thereof will be omitted.

Figure 4:
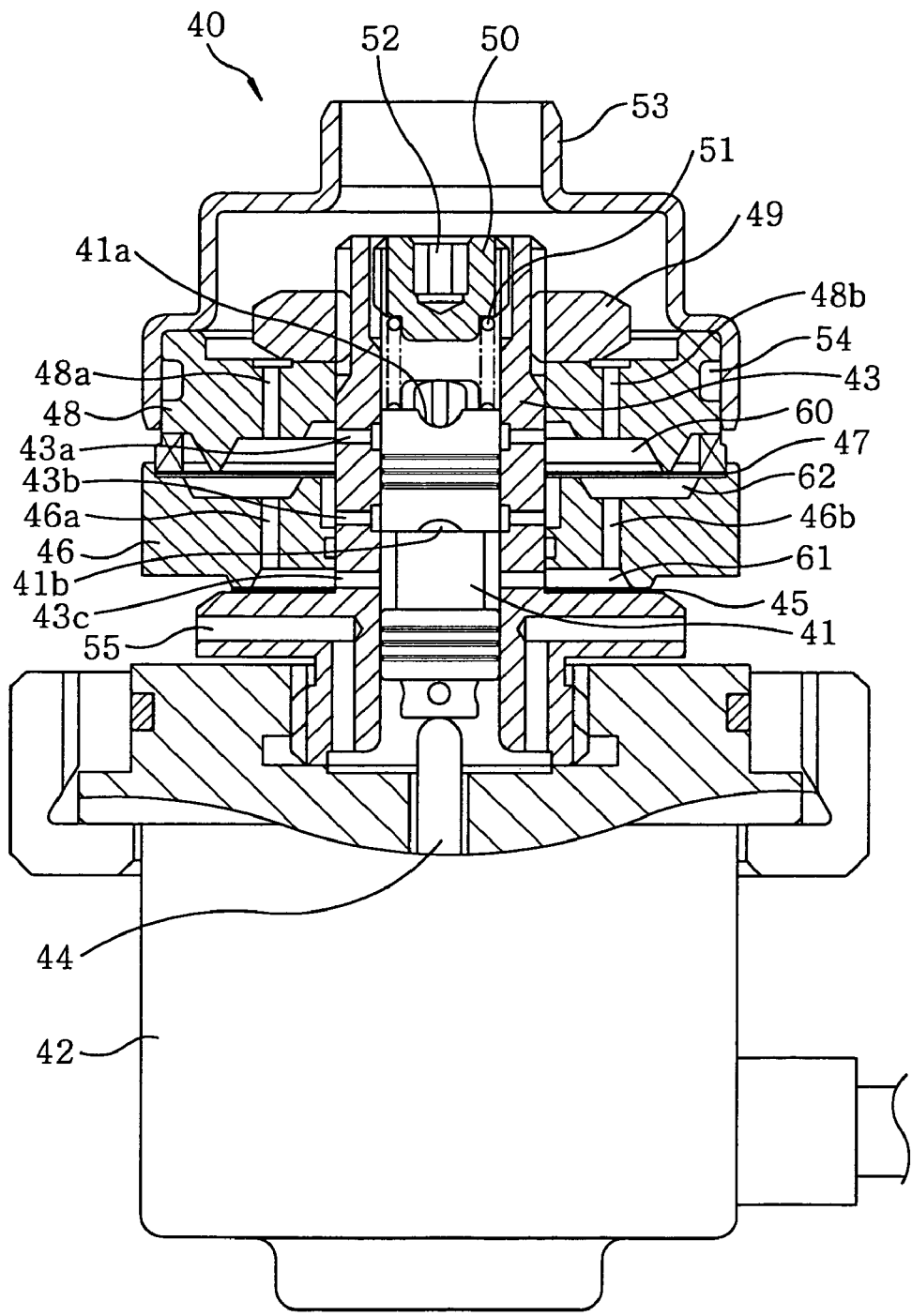
FIG. 4 provides a cross sectional view of a damping force variable valve in accordance with the present invention.

Referring to FIG. 4, there is provided an enlarged cross sectional view of a damping force variable valve in accordance with a preferred embodiment of the present invention.

A spool rod 43 for guiding a sliding movement of a spool 41 is connected to an actuator 42 for varying a position of the spool 41, wherein an active rod 44 of the actuator 42 is inserted into the spool rod 43. The spool rod 43 has a hollow portion at the center thereof into which the spool 41 is inserted and a plurality of connection ports 43a to 43c arranged in a radial direction to connect the hollow portion of the spool rod 43 to the outside thereof. Further, a ring disk 45, which has a central opening through which the spool rod 43 is inserted; and slits provided on the circumferential portion of the central opening, is inserted into the spool rod 43 to be connected therewith. The ring disk 45 serves as a fixed orifice to be described later. A lower retainer 46, which has a central opening through which the spool rod 43 is inserted, is placed on the ring disk 45 by being inserted into the spool rod 43, while serving to fix the position of the spool rod 43. The lower retainer 46 includes connection ports 46a and 46b for allowing a flow of oil.

A ring disk 47, which has a central opening through which the spool rod 43 is inserted and slits, is installed on the lower retainer 46. The ring disk 47 separates a high pressure section Ph and a control chamber 62, while serving as a main valve to be described later. The ring disk 47 is preferably a membrane of a disk type. Further, a upper retainer 48, which has a central opening through which the spool rod 43 is inserted, is placed on the ring disk 47 by being inserted into the spool rod 43, while serving to fix the position of the spool rod 43. The upper retainer 48 includes connection ports 48*a* and 48*b* for allowing a flow of oil.

The above-described spool rod 43, lower retainer 46 and upper retainer 48, and so forth are connected as a single unit by a nut 49. The spool 41 is inserted into the central hollow portion of the spool rod 43, wherein the spool 41 is forced to make reciprocating motions by the actuator 42. Further, a plug 50 is engaged with one end portion of the spool rod 43. The spool 41 is elastically fixed in a position by a compression spring 51 provided between the spool 41 and the plug 50 and a compression spring (not shown) which pressurizes a rear end portion of the active rod 44 of the actuator 42. The initial position of the spool 41 is adjusted by a screw 52. An upper retainer guide 53 is installed to cover the upper retainer 48, wherein a gap therebetween is hermetically sealed by an O ring 54.

The spool 41 to be inserted into the spool rod 43 has a hollow portion (not shown) and a plurality of stepped portions with different outer diameters formed in a vertical direction. An upper spool slit 41*a* and a lower spool slit 41*b* are formed at a stepped portion having a larger outer diameter among the plurality of stepped portions. In such a case, the upper spool slit 41*a* is formed to have a size larger than that of the lower spool slit 41*b* such that an area variation ratio of the upper spool slit 41*a* against the connection port 43*a* of the spool rod 43 becomes greater than that of the lower spool slit 41*b* against the connection port 43*b* of the spool rod 43 when the spool 41 reciprocates.

Figure 5:
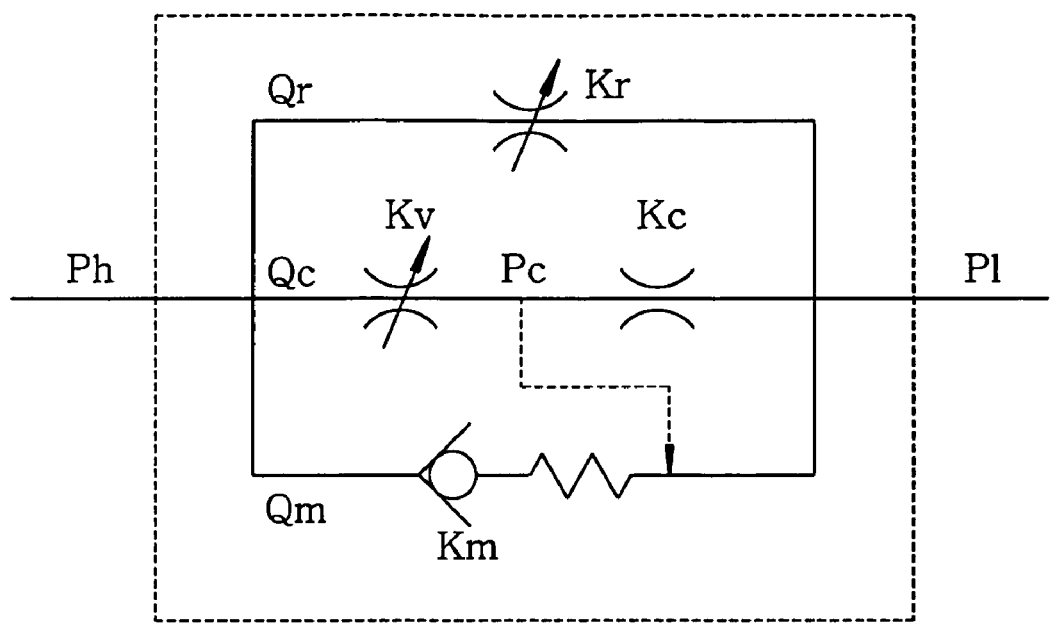
FIG. 5 is a flow passage diagram showing flow passages of the damping force variable valve in accordance with the present invention.

FIG. 5 is a flow passage diagram showing a flow passage of the damping force variable valve 40. Hereinafter, the flow of oil in the damping force variable valve 40 in accordance with the present invention will be described with reference to FIGS. 4 and 5.

Oil is introduced into a hydraulic chamber 60 formed by the upper retainer 48 and the ring disk 47 from a high pressure section Ph via the connection ports 48*a* and 48*b* of the upper retainer 48 by the movement of the piston. The oil moved into the hydraulic pressure 60 is flown into the inside of the spool rod 43 via a second variable orifice Kr formed by the connection port 43*a* of the spool rod 43 and the upper spool slit 41*a* of the spool 41 and then is moved to a low pressure section P1 via the hollow portion of the spool 41 and a connection port 55 connected to the low pressure section P1. As a result, a first flow passage Qr including the second variable orifice Kr provided between the high pressure section Ph and the low pressure section P1 is obtained, as shown in FIG. 5. Here, the high pressure section Ph refers to a portion connected to a rebound chamber of the cylinder while the low pressure section P1 represents a portion coupled to a reservoir.

The oil moved into the hydraulic chamber 60 as described above is introduced into a hydraulic chamber 61 via the slits of the ring disk 47, the first variable orifice Kr including the connection port 43*b* of the spool rod 43 and the lower spool slit 41*b* of the spool 41, and the connection port 43*c* of the spool rod 43 in order. Some of the oil in the hydraulic chamber 61 is then flown to the low pressure section P1 through slits (not shown) provided around the circumference of the ring disk 45 constituting a fixed orifice Kc. As a result, a second flow passage Qc including the first variable orifice Kv installed between the high pressure section Ph and the control chamber 62 and the fixed orifice Kc installed between the control chamber 62 and the low pressure section P1 is obtained, as shown in FIG. 5. The residual oil in the hydraulic chamber 61 that has not flown through the fixed orifice Kc is moved into the control chamber 62 formed by the lower retainer 46 and the ring disk 47.

If the pressure difference between the high pressure section Ph and the control chamber 62 is increased due to a rise of the flow rate during a rebound or a compression stroke, the ring disk 47 is bent in a direction toward the control chamber due to a force generated by the pressure difference. That is, there may be caused a gap between the upper retainer 48 and the ring disk 47 depending on the pressures of the high pressure section Ph and the control chamber 62 and the initial preload of the ring disk 47. In such a case, a main valve Km is opened, making the oil flow from the high pressure section Ph to the low pressure section P1 directly. As a consequence, a third flow passage Qm including the main valve Km provided between the high pressure section Ph and the low pressure section P1 is obtained as shown in FIG. 5.

In case the flow rate is reduced during a rebound or a compression stroke, the pressure difference between the high pressure section Ph and the control chamber 62 decreases, so that the ring disk 47 returns to its initial position depending on the preload of the ring disk type 47. As a result, the main valve Km is closed.

As described above, the damping force variable valve 40 in accordance with the present invention includes the first flow passage Qr having the second variable valve Kr, the second flow passage Qc having the first variable valve Kv and the fixed orifice Kc and the third flow passage Qm having the main valve Km. The main valve Km is opened at different pressures depending on the pressure of the control chamber 62, wherein the pressure of the control chamber 62 is determined by the operations of the first variable orifice Kv installed upstream thereof and the fixed orifice Kc installed downstream thereof. Thus, by controlling the area of the first variable orifice Kv, the pressure of the control chamber 62 is increased, so that the state of the valve is converted into a hard mode. Further, the second variable orifice Kr having an area variation ratio greater than that of the first variable orifice Kv allows the flow of oil from the high pressure section Ph to the low pressure section P1. Here, the cross sectional area of the second variable orifice Kr is reduced as the cross sectional area of the first variable orifice Kv is increased, whereas the cross sectional area of the second variable orifice Kr is increased as the cross sectional area of the first variable orifice Kv is decreased.

Through this mechanism, the entire flow rate in the hard mode within the low speed range prior to the blow-off time can be maintained smaller than that in a soft mode at a same pressure. Furthermore, even when the active area of the high pressure section of the main valve Km is smaller than that of the control chamber 62, the blow-off time of the hard mode can be obtained at a low flow rate and at a high pressure. Thus, since an appropriate damping force characteristic can be obtained regardless of the area, the structure of the main valve can be simplified.

Furthermore, within the low speed range where the flow rate of the oil is small and in the soft mode (where the area of the first variable orifice is reduced while the are of the second variable orifice is increased), the flow rate of the oil is mainly determined by the cross sectional area of the second variable orifice Kr. Therefore, it is possible to tune a damping force characteristic at the low speed range in the soft mode by controlling the characteristic of the second variable orifice Kr. Meanwhile, within the low speed range where the flow rate of the oil is small and in the hard mode (where the area of the first variable orifice is increased while the area of the second variable orifice is reduced), the flow rate of the oil is primarily determined by the cross sectional areas of the first variable orifice Kv and the fixed orifice Kc.

Therefore, it is possible to tune a damping force characteristic at the low speed range in the hard mode by controlling the characteristics of the first variable orifice Kv and the fixed orifice Kc. Consequently, the damping force characteristics of the soft mode and the hard mode at the piston low speed range can be respectively controlled by using different orifice characteristics, so that the degree of freedom in tuning the damping force characteristics can be improved.

The above-described improved damping force variable valve 40 can be installed in the damping force variable type shock absorber 1 to generate an appropriate damping force depending on the movement of the vehicle.

As described above, the inventive structure of the present invention makes it possible to obtain an appropriate damping force characteristic even in case the active area of the high pressure section of the main valve is greater than that of the control chamber. Accordingly, the structure of the main valve can be simplified. Furthermore, since the damping force characteristics of the soft mode and the hard mode at the piston low speed range can be respectively tuned by controlling the difference orifice characteristics, the degree of freedom in tuning the damping force characteristics can be improved.

While the invention has been shown and described with respect to the preferred embodiment of the present invention, it will be understood by those skilled in the art that various changes and modifications may be made without departing from the spirit and scope of the invention as defined in the following claims:

What is claimed is:

1. A damping force variable valve for use in a damping force variable type shock absorber, comprising:
    a main valve provided between a high pressure section and a low pressure section, for allowing a flow of oil from the high pressure section into the low pressure section when the main valve is opened, the main valve being capable of being opened or closed depending on a pressure of the high pressure section, an initial preload and a pressure of a control chamber;
    a first variable orifice provided in the fluid path between the high pressure section and the
    control chamber, for controlling the pressure of the control chamber;
    a fixed orifice provided in the fluid path between the control chamber and the low pressure section;
    a second variable orifice provided in the fluid path between the high pressure section and the low pressure section; and
    wherein the first variable orifice and the second variable orifice are controlled by a sliding movement of a spool engaged with an actuator.

2. The valve of claim 1, wherein the first variable orifice and the second variable orifice can be controlled by means of a single actuator.

3. The valve of claim 1, wherein a cross sectional area of the second variable orifice is reduced as a cross sectional area of the first variable orifice is increased, whereas the cross sectional area of the second variable orifice increased as the cross sectional area of the first variable orifice is reduced.

4. The valve of claim 2, wherein a cross sectional area of the second variable orifice is reduced as a cross sectional area of the first variable orifice is increased, whereas the cross sectional area of the second variable orifice is increased as the cross sectional area of the first variable orifice is reduced.

5. The valve of claim 3, wherein a variation ratio of the cross sectional area of the second variable orifice is greater than that of the first variable orifice.

6. The valve of claim 4, wherein a variation ratio of the cross sectional area of the second variable orifice is greater than that of the first variable orifice.

7. The valve of claim 1, wherein the main valve is formed of an integrated membrane of a disk type.

8. A damping force variable type shock absorber comprising a cylinder having oil sealed therein; a piston moved up and down inside the cylinder while dividing the inside of the cylinder into a rebound chamber and a compression chamber; a piston rod whose one end is connected to the piston while the other end thereof is extended to the outside of the cylinder; a reservoir communicated with the cylinder while compensating a volume variation of the inside of the cylinder; and a damping force variable valve,
    wherein the damping force variable valve includes a main valve provided between a high pressure section and a low pressure section, for allowing a flow of oil from the high pressure section into the low pressure section when the main valve is opened, the main valve being capable of being opened or closed depending on a pressure of the high pressure section, an initial preload and a pressure of a control chamber;
    a first variable orifice provided in the fluid path between the high pressure section and the control chamber, for controlling the pressure of the control chamber;
    a fixed orifice provided in the fluid path between the control chamber and the low pressure section;
    a second variable orifice provided in the fluid path between the high pressure section and the low pressure section; and
    wherein the first variable orifice and the second variable orifice are controlled by a sliding movement of a spool engaged with an actuator.

9. The shock absorber of claim 8, wherein the first variable orifice and the second variable orifice can be controlled by means of a single actuator.

10. The shock absorber of claim 8, wherein a cross sectional area of the second variable orifice is reduced as a cross sectional area of the first variable orifice is increased, whereas the cross sectional area of the second variable valve is increased as the cross sectional area of the first variable orifice is reduced.

11. The shock absorber of claim 9, wherein a cross sectional area of the second variable orifice is reduced as a cross sectional area of the first variable orifice is increased, whereas the cross sectional area of the second variable orifice is increased as the cross sectional area of the first variable orifice is reduced.

12. The shock absorber of claim 10, wherein a variation ratio of the cross sectional area of the second variable orifice is greater than that of the first variable orifice.

13. The shock absorber of claim 11, wherein a variation ratio of the cross sectional area of the second variable orifice is greater than that of the first variable orifice.

14. The shock absorber of claim 8, the main valve is formed of an integrated membrane of a disk type.

* * * * *